D. STRICKLAND.
BRICKMAKING MACHINE.
APPLICATION FILED MAR. 18, 1911. RENEWED JUNE 26, 1916.

1,215,215.

Patented Feb. 6, 1917.
2 SHEETS—SHEET 1.

Witnesses:
Harry C. Hebig
Wm. E. Dunn

Inventor
David Strickland,
By his Attorney

D. STRICKLAND.
BRICKMAKING MACHINE.
APPLICATION FILED MAR. 18, 1911. RENEWED JUNE 26, 1916.

1,215,215.

Patented Feb. 6, 1917.
2 SHEETS—SHEET 2.

Witnesses:
Harry C. Hecbig
Wm. C. Dunn

Inventor
David Strickland,
By his Attorney
Chas. Lyon Russell.

UNITED STATES PATENT OFFICE.

DAVID STRICKLAND, OF NEW YORK, N. Y.

BRICKMAKING-MACHINE.

1,215,215.  Specification of Letters Patent.  Patented Feb. 6, 1917.

Application filed March 18, 1911, Serial No. 615,198. Renewed June 26, 1916. Serial No. 106,059.

*To all whom it may concern:*

Be it known that I, DAVID STRICKLAND, a citizen of the United States, residing in the city of New York, borough of Bronx, county and State of New York, have invented certain new and useful Improvements in Brickmaking-Machines, of which the following is a full, clear, and exact specification.

This invention relates to brick making and has for its object to provide an improved brick making machine. The object of the invention is particularly to provide improved mechanism for molding bricks comprising a separable mold located at a position to be filled with the mud, mechanism for removing the molded brick upon release from the mold, and delivering the same to a conveyer, and a sander for sanding the mold while moist after each discharge of molded brick.

In the drawings accompanying and forming a part of this specification,

Figure 1:
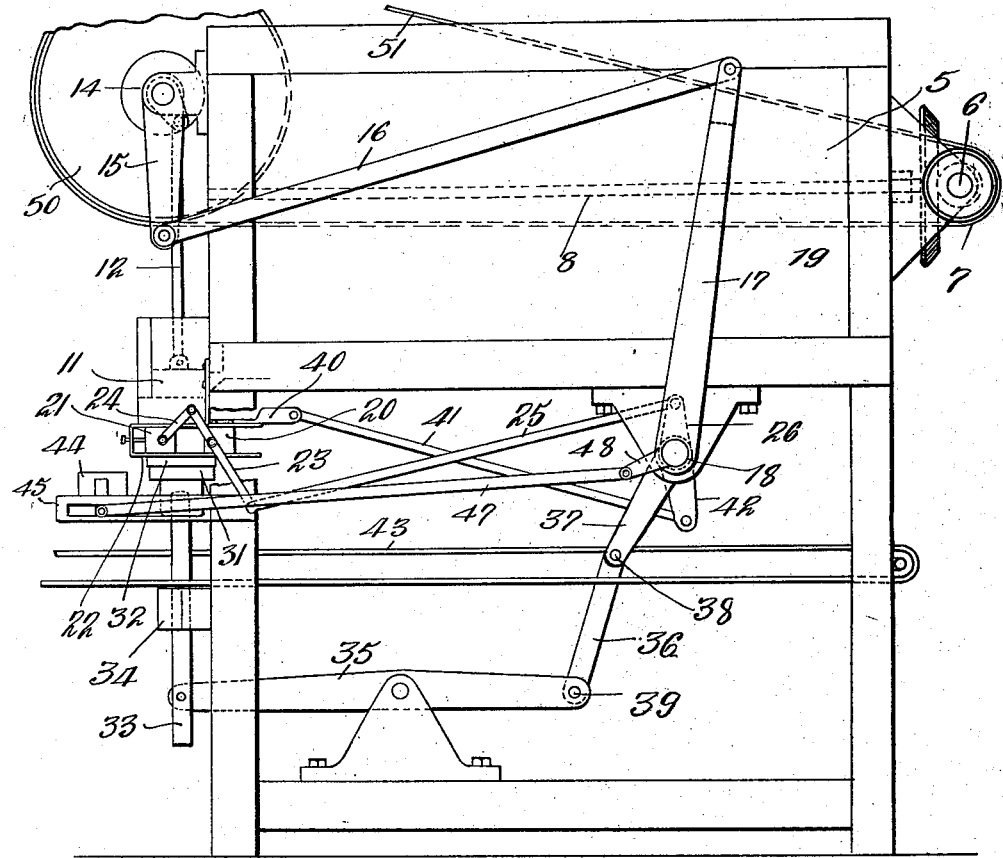
Figure 1 is an end elevation of a brick making machine equipped with a practicable form of my improvement.
Figure 4:
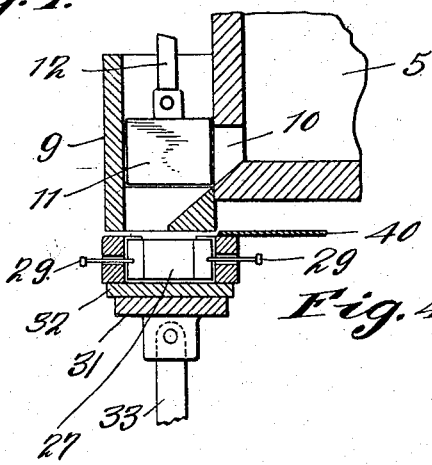
Fig. 4 is a section through a portion of the mud box, mud-spout, plunger, mold, pallet support and pallet, taken on a plane at about the line 4—4 of Fig. 2.
Figure 2:
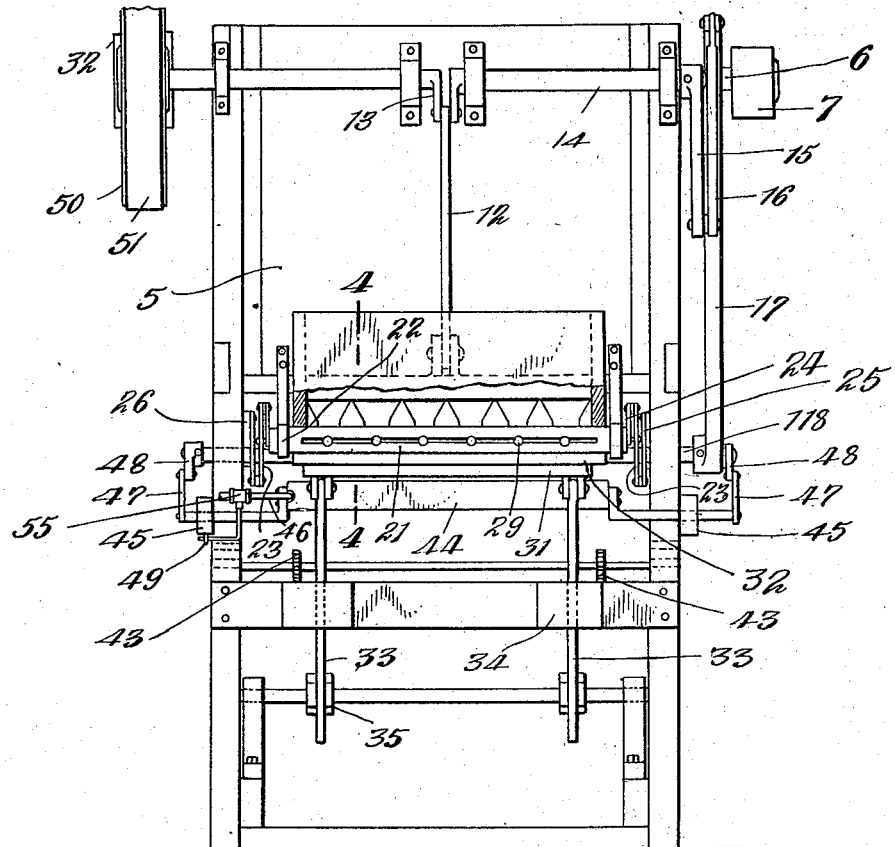
Fig. 2 is a front elevation of the device illustrated in Fig. 1.
Figure 3:
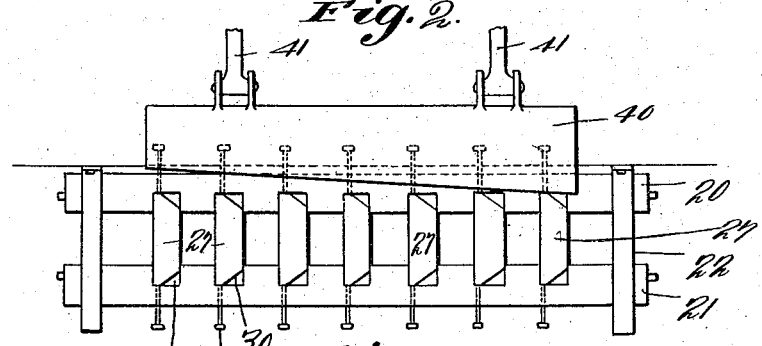
Fig. 3 is a top plan view of the separable mold and the dressing knife.

A mud box designated by the reference character 5 is shown supported on a frame work. The frame work carries a driving shaft 6 driven by means of a pulley 7 from some suitable source of power. A shaft 8 for the mixer will be driven by means of a train of gearing from the driving shaft. The mixer is a mere incident and is not illustrated or described with particularity.

The front end of the machine is provided with a mud-spout 9 which will be supplied with the mud through a suitable opening 10 in the mud box. The mud of course, will be moved toward this opening by means of the agitator in a well-known manner.

A plunger 11 is mounted in the spout for the purpose of forcing the mud out of the spout. This plunger is connected by means of a pitman 12 to a crank 13 carried by a shaft 14, which shaft is driven by means of a pulley 50 and belt 51 from a pulley 52 on shaft 6. The shaft 14 is provided with an arm 15, connected by means of a link 16, to a rock-lever 17 which is mounted on a rock-shaft 18.

In the present illustration the mold is open top and bottom and is fixedly supported at the discharge opening of the spout. The mold herein illustrated is a separable or openable mold which will be closed for receiving the mud and which will be opened at the proper time for releasing the molded brick. The mold is shown comprising two side members 20, 21, one of which, as for instance the most backwardly disposed member 20 may be fast to its supports 22 and the other may be movable therein toward and from the other upon a horizontal plane. A lever 23 is shown pivoted on the stationary side member 20 and connected by means of a link 24 with the movable member 21 and by means of a link 25 with a rock arm 26 fast on the rock shaft 18. This lever mechanism for actuating the mold is duplicated on the respective sides of the machine for the purpose of moving the parts in unison and for holding them locked in the closed position during the pressure upon the mud.

The divisions for forming the individual bricks will be in the present illustration produced by means of a series of partitions 27. The ends of the partitions enter mortises 28 in the members 20, 21. In the present illustration there are seven partitions, the mold being constructed for molding six brick at an operation. The number of brick to be made at each operation in any particular machine may be varied by varying the number of partitions and associated parts. The ends of the partitions are shown carried by guides in the nature of pins 29 extending through suitably formed openings in the side members 20, 21. The respective ends of the partitions are shown chamfered at 30 for permitting a sidewise movement of the partitions longitudinally of the side members when the device is opened and also for the purpose of more readily assisting in guiding the parts to their desired positions after there has been individual movement of these members relative to the side members. The mold portion of the device embodies a series of mold spaces, each having a pair of side walls and a pair of end walls disposed in position for forming a brick having greater length than width. The side walls are separable one from the other by relative movement in a path perpendicular to their mold faces, and the end walls are similarly separable by relative movement in a path perpendicular to their mold faces.

A pallet support 31 is provided which will move a pallet 32 against the lower face of the mold and there support it during the pressing operation. The pallet support is mounted on a pair of plungers 33 supported by suitable guides 34 and is shown as having a vertical movement. The plungers are fastened to levers 35 which are connected by means of links 36 to rock arms 37 on the rock shaft 18. The pallet support actuating mechanism is so timed that a pallet will be presented to the open lower end of the mold and serves as a closure for the vent, which such lower open end is since the molded brick are there discharged, and withstands the pressure of the plunger during the pressing operation. The pallet will preferably be locked against the action of the mud plunger. In the present illustration the rock arm 37 has a sufficient overthrow for shifting the pivotal connection 38 between the arm 37 and link 36 past the straight line between the axis of the rock shaft 18 and the pivotal connection 39 between the lever 35 and link 36. The releasing movement for the pallet support will be the movement of the pivot 38 toward the right in Fig. 1.

The dressing knife 40 is mounted to move across the top of the mold and be guided thereby. It is connected by means of a pair of pitmen 41 with rock arms 42 fast upon the rock shaft 18 and so timed that after the mud has been pressed into the mold and the plunger 11 has commenced to raise and thereby release its pressure upon the mud it will be moved forward across the face of the mold and dress and form the top face of the brick, the bottom face of the brick being formed by the pallet.

After the brick have been molded and dressed the mold will be opened for releasing the brick from the mold and the pallet support will be lowered carrying the pallet and the brick which are freed from the mold. In the path of movement of the pallet with its support are located the upper runs 43 of a pair of endless conveyers so that upon the lowering of the loaded pallet it will be placed upon the conveyer and removed from the machine.

A sand box 44 is mounted on suitable guides 45 which are so located that the sand box may be drawn into position to deliver sand in the mold. The sand box is provided with a suitable agitator, as for instance with an air blast device illustrated in a general way by 46. A pair of pitmen 47 are connected to the ends respectively of the sand box and are connected to rock arms 48 on the rock shaft 18. The actuator mechanism for the sand box is so timed that the sand box will be drawn under the mold as soon as the pallet support has been lowered sufficiently for this purpose. A tripping device designated by 49 is provided for releasing the sand agitator after the sand box has been brought under the mold. In the present illustration an air cock 55 is provided which will be opened by engaging the tripping device 49. The sand box will be drawn into position under the mold, the air cock opened, sand will be blown upon the moist surfaces of the mold, the sand box will be moved away with the incident closing of the air cock and the molds will be again closed, a fresh pallet will be placed upon the support which will be moved to the bottom of the closed molds; the dressing knife which acts as a valve will be withdrawn from the bottom of the spout and the plunger again actuated to press a fresh charge of mud into the molds.

It will be apparent that changes of construction may be made without departing from my invention.

Having thus described my invention I claim:

1. In a brick-making machine, the combination with a mud spout, of a separable mold open top and bottom and fixedly supported below the mud spout, a pallet support movable toward and from the bottom of the mold in a vertical path below the bottom of the mold, and mechanism for actuating the mold and the support in sequential timing for opening the mold and lowering the pallet and the molded brick from the mold.

2. In a brick making machine, the combination with a mud spout, mechanism for discharging mud from the spout, and mechanism timed for intermittently actuating the discharging mechanism, of a separable mold located in position to receive the discharge from the spout, mold actuating mechanism in operative connection with the discharging means for closing the mold prior to each discharge and for opening the same after each discharge, a pallet-conveyer, a pallet support, actuating mechanism for the support in operative connection with the discharging means and located in position to shift a pallet to the mold prior to the discharge and hold the same at the mold during the discharge and after the opening of the mold to shift the pallet from the mold to the conveyer, a sand box, sand box guides extending toward the mold, and sand box actuating mechanism for shifting said box on the guides and timed for bringing the sand box into operative position relative to the mold after the pallet support has been moved away from the mold.

3. In a brick making machine, the combination with a mud spout, mechanism for discharging mud from the spout, and mechanism timed for intermittently actuating the discharging mechanism, of a separable mold located in position to receive the discharge from the spout, mold actuating mechanism, means timed for closing the mold prior to each discharge and for opening the same after each discharge, a knife timed to dress the top of the mold after discharge from the spout, a pallet-conveyer, a pallet support, actuating mechanism for the support located in position and timed to shift a pallet to the mold prior to the discharge and hold the same at the mold during the discharge and after the opening of the mold to shift the pallet from the mold to the conveyer, a sand box, sand box guides extending toward the mold, and sand box actuating mechanism for shifting said box on its guides and timed for bringing the sand box into operative position relative to the mold after the pallet support has been moved away from the mold.

4. In a brick-making machine the combination with a spout and a plunger located therein, of a mold provided with several mold spaces located in position to receive the discharge from the spout and comprising a stationary side bar and a side bar shiftable toward and from the same, said side bars being provided upon their opposed faces with mortises, partitions located between said side bars for dividing off the mold spaces and having their ends disposed in said mortises, each partition being chamfered at its ends, plunger actuating mechanism, a lever mounted upon the stationary bar, a link connected to the movable bar and pivoted to said lever, and an operative connection between said lever and the plunger actuating mechanism.

5. In a brick making machine the combination with a spout and a plunger located therein, of a mold provided with a plurality of mold spaces located in position to receive the discharge from the spout and comprising a stationary side bar, and a side bar shiftable toward and from the same, said side bars being provided upon their opposed faces with mortises, partitions located between said side bars for dividing off the mold spaces and having their ends disposed in said mortises, each partition being chamfered at its ends, pins carried by the partition ends and supported by the side bars for movement longitudinally thereof, plunger actuating mechanism, and side bar actuating mechanism in operative connection with the plunger actuating mechanism.

In witness whereof I have hereunto set my hand in the presence of two subscribing witnesses.

DAVID STRICKLAND.

Witnesses:
R. E. BUCKHOLZER,
H. W. VOELKER.

Copies of this patent may be obtained for five cents each, by addressing the "Commissioner of Patents, Washington, D. C."